United States Patent [19]

Morikawa

[11] Patent Number: 5,025,625

[45] Date of Patent: Jun. 25, 1991

[54] COMMONLY HOUSED DIRECTIONAL AND PRESSURE COMPENSATION VALVES FOR LOAD SENSING CONTROL SYSTEM

[75] Inventor: Rindo Morikawa, Higashimatsuyama, Japan

[73] Assignee: Hitachi Construction Machinery Co., Ltd., Tokyo, Japan

[21] Appl. No.: 432,858

[22] Filed: Nov. 7, 1989

[30] Foreign Application Priority Data

Nov. 10, 1988 [JP] Japan .............................. 63-284593

[51] Int. Cl.[5] ........................ F16K 11/00; F15B 11/16

[52] U.S. Cl. ........................................ 60/426; 91/446; 91/517; 91/518; 137/596; 137/596.13

[58] Field of Search ................................ 60/426, 427; 91/446-448, 512, 517-518, 466; 137/596, 596.13

[56] References Cited

U.S. PATENT DOCUMENTS

| | | | |
|---|---|---|---|
| 3,970,108 | 6/1976 | Ailshie | 91/446 X |
| 4,154,262 | 5/1979 | Blume et al. | 91/446 X |
| 4,617,854 | 10/1986 | Kropp | 91/517 |
| 4,688,600 | 8/1987 | Kreth et al. | 91/446 X |
| 4,709,724 | 12/1987 | Williams | 137/596 |
| 4,739,617 | 4/1988 | Kreth et al. | 60/426 |
| 4,967,557 | 11/1990 | Izumi et al. | 60/426 X |

FOREIGN PATENT DOCUMENTS

| | | |
|---|---|---|
| 3644737 | 7/1988 | Fed. Rep. of Germany . |
| 110884 | 7/1982 | Japan . |
| 10707 | 3/1986 | Japan . |

*Primary Examiner*—Edward K. Look
*Assistant Examiner*—George Kapsalas
*Attorney, Agent, or Firm*—Fish & Richardson

[57] ABSTRACT

A hydraulic control system for driving a plurality of actuators basically includes directional control valves, and pressure compensation valves, and at least one detection valve, the directional valves and the pressure compensation valves both corresponding in number to the actuators. These valves are mounted or incorporated in a body. The body has a plurality of regions corresponding in number to the actuators. Each of the regions of the body has a first hole, and a second hole substantially perpendicularly intersecting the first hole. A load pressure chamber for receiving a load pressure of the corresponding actuator is formed at the intersection between the first and second holes of each region. A spool of the directional control valve is received in the first hole. A balance piston of the pressure compensation valve is received in that portion of the second hole disposed on one side of the load pressure chamber. The detection valve is received in that portion of the second hole disposed on the other side of the load pressure chamber.

13 Claims, 9 Drawing Sheets

COMMONLY HOUSED DIRECTIONAL AND PRESSURE COMPENSATION VALVES FOR LOAD SENSING CONTROL SYSTEM

BACKGROUND OF THE INVENTION

This invention relates to a hydraulic control system for controlling the operations of a plurality of actuators.

A civil engineering machine (e.g., a power shovel) or other machine including a plurality of actuators is equipped with a hydraulic control system. One such conventional hydraulic control system as described in the prior art section of the specification of Japanese Laid-Open (Kokai) Patent Application No. 11706/85 comprises one pump of a large capacity, directional control valves corresponding respectively to the actuators, and flow control valves of the pressure compensating type (hereinafter referred to as "pressure compensation valves"). Each pressure compensation valve is connected between the pump and its mating directional control valve.

Each directional control valve has two actuator ports connected to the actuator, and a spool which can be moved through an external operation. When the spool is moved from its neutral position in one direction, one of the actuator ports is selectively communicated with the pressure compensation valve, so that oil fed from the pump is supplied to the actuator via the pressure compensation valve and the selected actuator port, thereby driving the actuator in one direction. When the spool of the directional control valve is moved in the opposite direction, the other actuator port is communicated with the pressure compensation valve, so that the actuator is driven in the opposite direction. The directional control valve has a throttle portion which varies in the degree of opening (i.e., the cross-sectional area of flow) in accordance with the position of the spool.

Each pressure compensation valve comprises a balance piston, a spring urging the balance piston, and a throttle portion whose degree of opening is controlled by the balance piston. A pressure (pressure supplied to the directional control valve from the pressure compensation valve) in a passage extending between the throttle portion of the pressure compensation valve and the throttle portion of the directional control valve is applied to the balance piston, and also a load pressure produced in the actuator is applied to the balance piston. These two pressures act on the balance piston in opposite directions. The position of the balance piston and hence the degree of opening of the throttle portion of the pressure compensation valve are so determined that a pressure differential across the balance piston (i.e., a difference between these two pressures) can be kept at a predetermined target value or level. This target value is determined by the spring force of the above spring.

Thus, with the use of the pressure compensation valve, irrespective of the load pressure produced in each actuator, the actuator receives an amount of the oil (per unit time) corresponding to the degree of opening of the throttle portion determined by the position of the spool of the directional control valve.

When the total amount of the oil per unit time, required by the actuators operating at the same time, becomes too large, the ability of the pump to output the oil becomes inadequate, so that the pump pressure decreases. At this time, the pressure compensation valves fully open the throttle so that the difference between the supply pressure supplied from the pressure compensation valve and the load pressure can be increased to the target value determined by the spring (Actually, this difference does not reach this target value). As a result, the pressure compensation valves lose their pressure compensation function, so that those of the actuators receiving relatively small loads are driven whereas the other actuators receiving relatively heavy loads are not driven.

The hydraulic control system shown in the drawings of the above Japanese Laid-Open Patent Application No. 11706/85 overcomes the above problems. In this conventional hydraulic control system, the maximum load pressure is applied to the balance pistons of all of the pressure compensation valves in the direction to close the throttles of the pressure compensation valves, and at the same time the pressure of the pump is applied to the balance pistons in the direction to open the throttles of the pressure control valves. Here, "the maximum load pressure" means the greatest load pressure among the load pressures produced in the plurality of actuators. The force produced due to a difference between the pump pressure and the maximum load pressure is used instead of the force produced by the aforesaid spring. In this hydraulic control system, when the total amount of the oil required by the actuators per unit time exceeds the ability of the pump to output the oil to decrease the pump pressure so that the difference between the pump pressure and the maximum load pressure decreases, the difference between the load pressure and the supply pressure supplied from the pressure compensation valves decreases in all the pressure compensation valves. As a result, the amounts of supply of the oil per unit time to those of the actuators which are being driven are reduced at the same rate. In this condition, the throttle portion of the pressure compensation valve corresponding to the actuator subjected to the maximum load pressure is fully opened, and the throttling functions of the other pressure compensation valves are secured, and hence those of the actuators corresponding to those of the directional control valves in their operative condition can be all driven irrespective of the magnitude of the load.

In order to determine the maximum load pressure among the above load pressures, there are used shuttle valves the number of which is less by one than the number of the plurality of actuators.

Other hydraulic control systems of the type, which include directional control valves, pressure compensation valves and check valves replacing shuttle valves (each group of valves correspond in number to the actuators), are disclosed in U.S. Pat. No. 4,739,617, West German Patent No. DE 36 44 737, and PCT application of Japan origin filed by one of the two Applicants of the present application (International Filing Date: July 7, 1989; Designated countries: U. S. A., Europe, etc.)

The above-mentioned hydraulic control systems have been proposed as relatively abstract hydraulic circuits, and a practical hydraulic control system of the type in which directional control valves, pressure compensation valves and shuttle valves are incorporated or mounted in a body have not yet been developed. The other of the two Applicants of the present application has filed Japanese Utility Model Application No. 46811/88 on Apr. 8, 1988 and directed to such a hydraulic control apparatus. It is expected that this Japanese utility model application will be laid open to public inspection on October or November, 1989.

Incidentally, Japanese Patent Publication No. 10707/86, Japanese Laid-Open Patent Application No. 110884/82, and U.S. Pat. No. 4,856,549 (filed by the other of the two Applicants of the present application) disclose the prior art which incorporate or contain at least one group of directional control valves, pressure compensation valves and shuttle valves in a body, although these prior art are different from the above-mentioned hydraulic control system.

SUMMARY OF THE INVENTION

It is an object of this invention to provide a hydraulic control system comprising a hydraulic control apparatus which is simple in construction, and includes one body of a compact-size incorporating or containing therein directional control valves, pressure compensation valves and shuttle valves.

According to the present invention, there is provided a hydraulic control system for driving a plurality of actuators, comprising:

(a) a pump;

(b) a plurality of directional control valves corresponding respectively to the plurality of actuators, each directional control valve comprising a pair of downstream throttle portions disposed between the pump and the corresponding actuator, and a spool for controlling the degree of opening of the pair of downstream throttle portions, and either of the two downstream throttle portions being opened in accordance with the movement of the spool to apply fluid to the corresponding actuator from the pump;

(c) detection valve means comprising at least one detection valve for detecting the maximum load pressure among load pressures of the plurality of actuators;

(d) a plurality of pressure compensation valves corresponding respectively to the plurality of actuators, each pressure compensation valve comprising an upstream throttle portion disposed between the pump and the pair of downstream throttle portions, and a balance piston for controlling the degree of opening of the upstream throttle portion, the balance piston having a first pressure receiving portion for receiving the load pressure of the corresponding actuator so as to move the balance piston in a direction to open the upstream throttle portion, the balance piston also having a second pressure receiving portion for receiving a supply pressure supplied from the upstream throttle portion to the downstream throttle portions so as to move the balance piston in a direction to close the upstream throttle portion, the balance piston including pressure receiving means for substantially receiving an operating pressure which decreases when the difference between the pressure of the pum and the maximum load pressure detected by the detection valve means decreases so that the balance piston can be moved in the direction to open the upstream throttle portion, and the position of the balance piston being so controlled that the force acting on the balance piston due to the difference between the supply pressure and the load pressure can be in equilibrium with the force acting on the balance piston due to the operating pressure received by the pressure receiving means; and (e) body means comprising a plurality of regions corresponding respectively to the plurality of actuators, the plurality of directional control valves as well as the plurality of pressure compensation valves being mounted respectively in the plurality of regions, each of the regions including a straight first hole and a straight second hole substantially perpendicularly intersecting a central portion of the first hole, the spool being slidably received in the first hole of the corresponding region of the body means, the intersection between the first and second holes forming a load pressure chamber for receiving the load pressure of the corresponding actuator, and the second hole having a first portion and a second portion between which the load pressure chamber is interposed, the balance piston of the pressure compensation valve being slidably received in the first portion of the second hole of the corresponding region of the body means, the first pressure receiving portion of the balance piston being directed toward the load pressure chamber, and the detection valve being received in the second portion of the second hole of one of the regions of the body means so as to receive the load pressure from the load pressure chamber.

DESCRIPTION OF THE PREFERRED EMBODIMENTS OF THE INVENTION

The invention will now be described with reference to the drawings.

Figure 1:
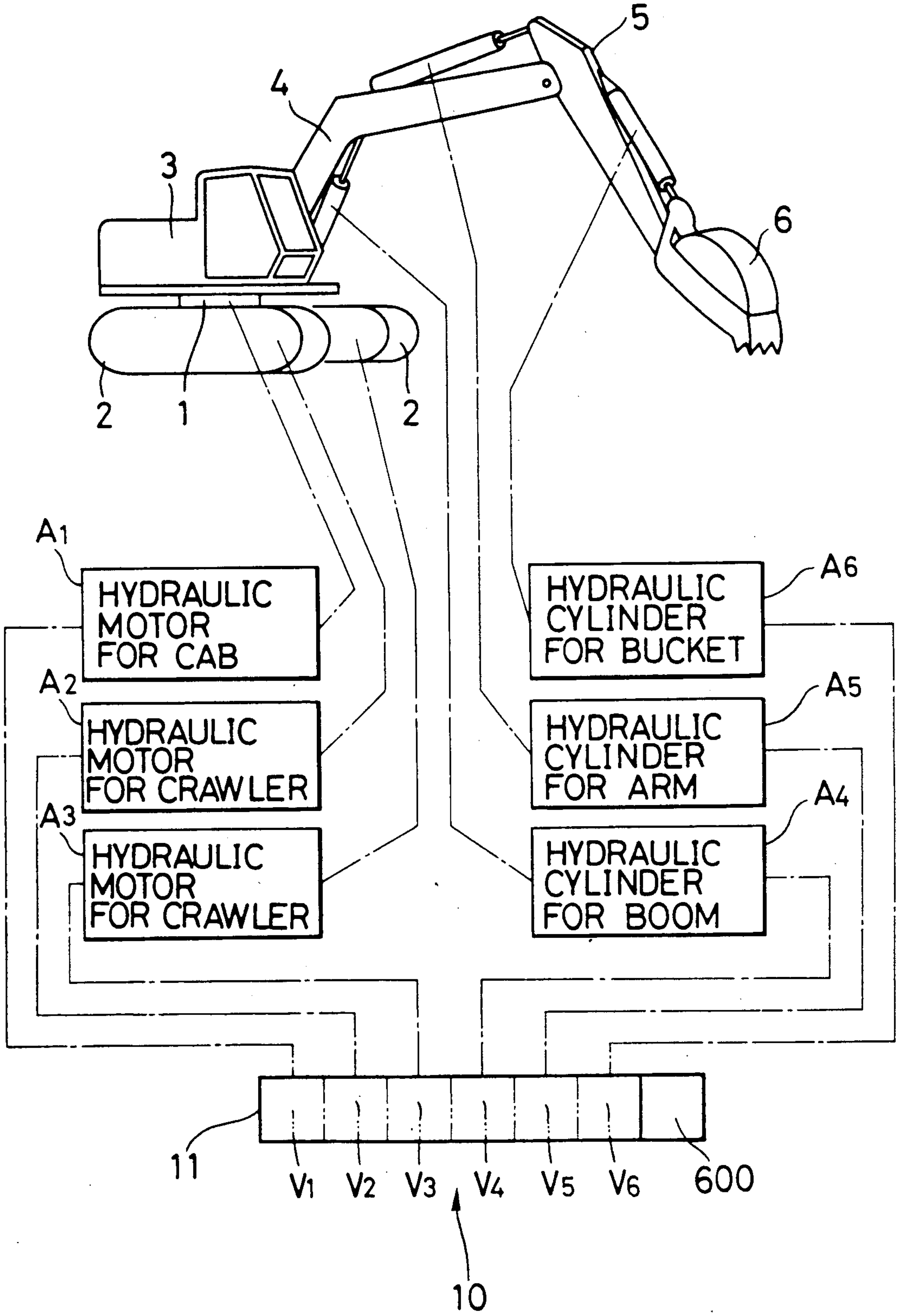
FIG. 1 is a schematic view showing a hydraulic control system of the present invention for use with a power shovel.

A power shovel shown in FIG. 1 comprises a vehicle body 1, a pair of crawlers 2 and 2 mounted on the vehicle body 1, an operator's cab 3 mounted on the vehicle body 1 so as to be turned horizontally, a boom 4 mounted on the operator's cab 3 so as to be angularly moved vertically, an arm 5 connected to the distal end of the boom 4 so as to be angularly moved vertically, and a bucket 6 connected to the distal end of the arm 5 so as to be angularly moved vertically. The operator's cab 3 is driven by a hydraulic motor A1 (actuator) for horizontal turning movement. The pair of crawlers 2 and 2 are driven by hydraulic motors A2 and A3 (actuators), respectively. The boom 4, the arm 5 and the bucket 6 are driven respectively by hydraulic cylinders A4, A5 and A6 (actuators) of angular movement. The three hydraulic motors A1 to A3 and the three hydraulic cylinders A4 to A6 are connected to a hydraulic control apparatus 10 of the present invention, and are controlled by this apparatus.

Figure 2:
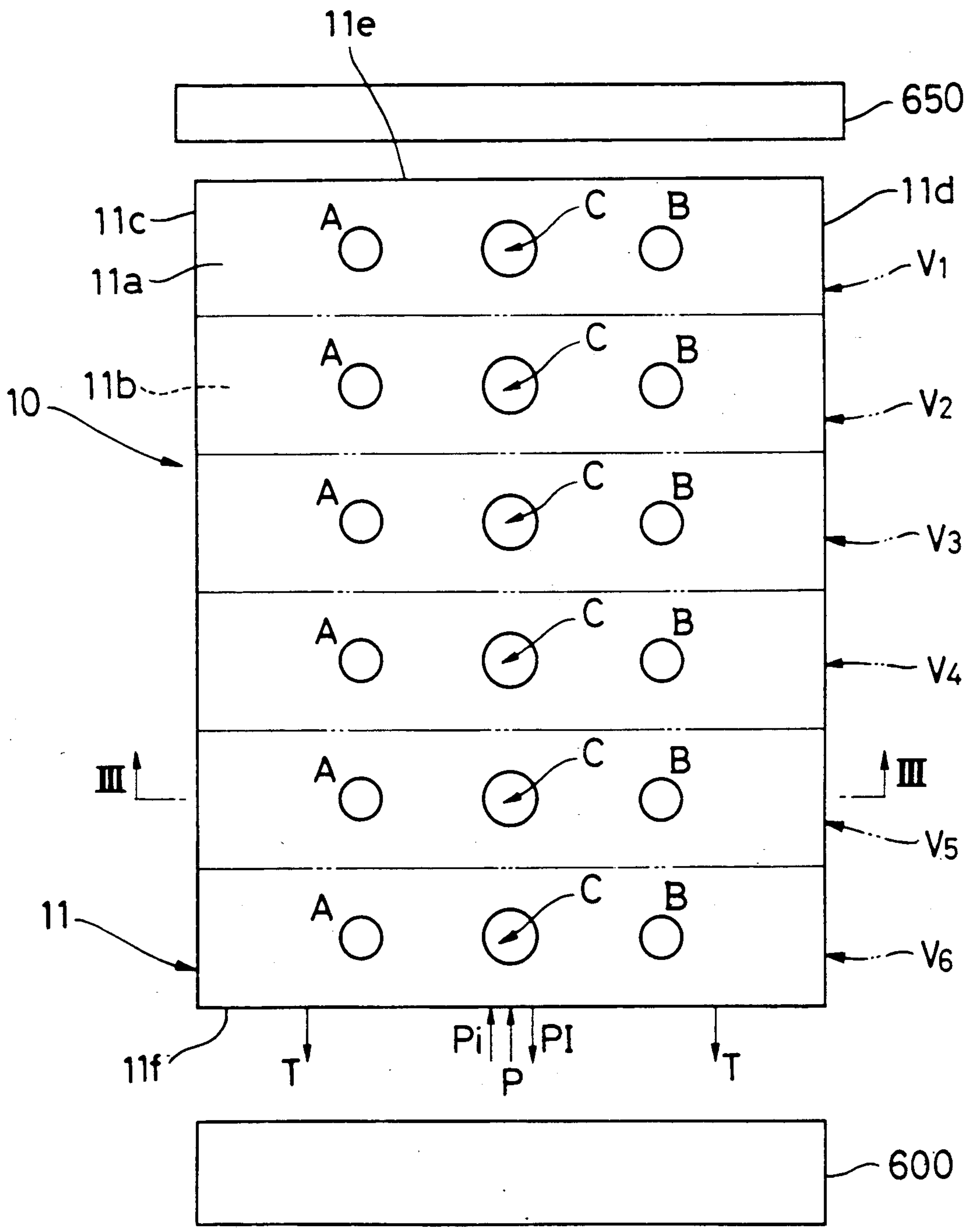
FIG. 2 is an enlarge schematic view of a body of the hydraulic control system.

As schematically shown in FIGS. 1 and 2, the hydraulic control apparatus 10 comprises a body 11 in the form of a substantially rectangular parallelepipedic block, an end plate 650, and an unload relief valve device 600. The end plate 650 and the unload and relief valve device 600 are mounted on the body 11 in stacked relation thereto. The body 11 has an upper face 11*a*, a lower face 11*b*, opposite side faces 11*c* and 11*d*, and opposite end faces 11*e* and 11*f*. The body 11 has six regions or portions V1 to V6 corresponding respectively to the six actuators A1 to A6. The regions V1 to V6 are arranged in this order from the end face 11*e* to the end face 11*f* along the length of the body 11. Each of the regions V1 to V6 has two actuator ports A and B which are connected to a respective one of the actuators A1 to A6 via two pipes (not shown). For example, with respect to the hydraulic cylinders A4 to A6, each pair of actuator ports A and B are connected respectively to two oil chambers of a respective one of these hydraulic cylinders.

Figure 3:
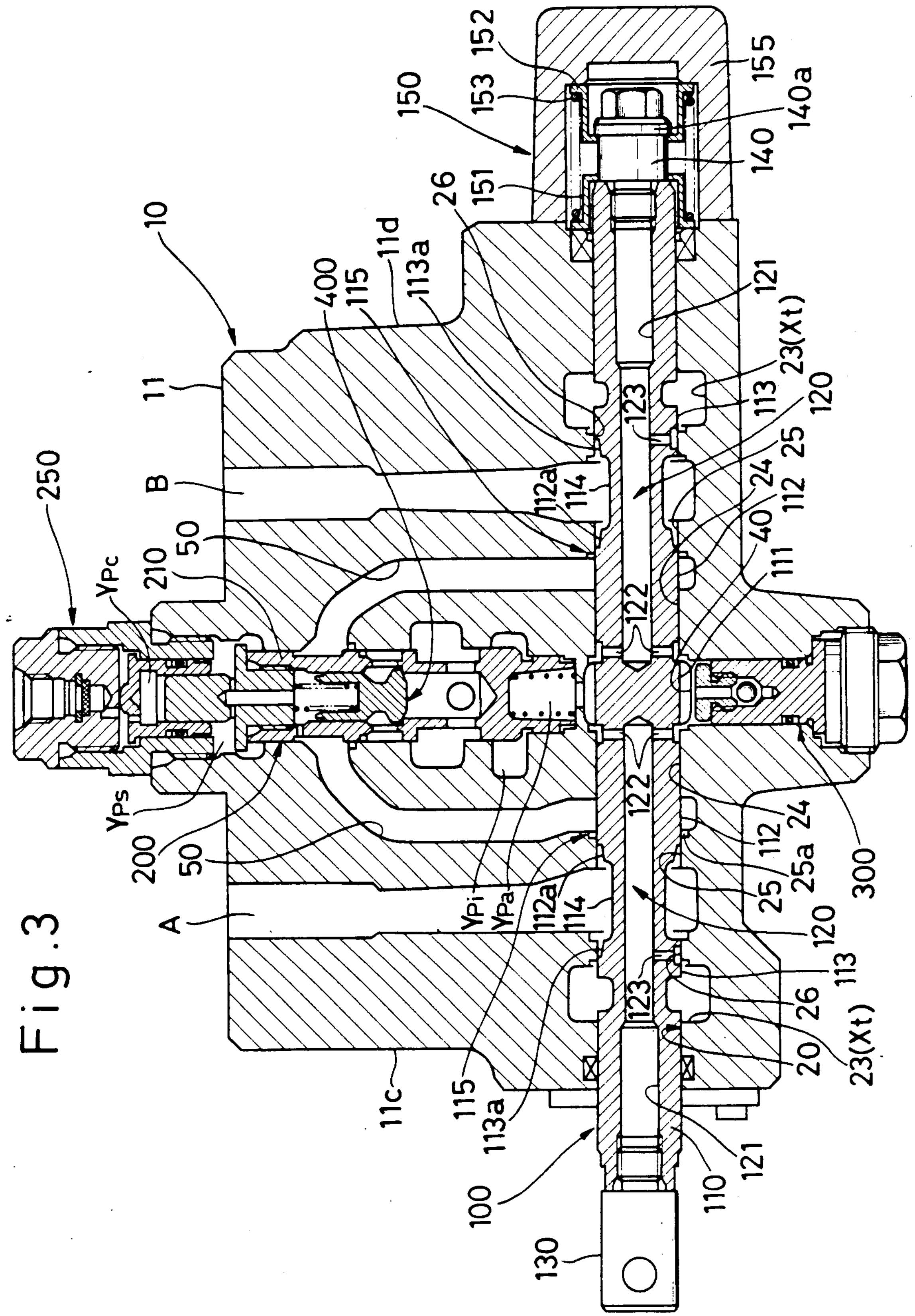
FIG. 3 is a cross-sectional view taken along the line III—III of FIG. 2.

As shown in FIG. 3, a directional control valve 100, a pressure compensation valve 200 and a shuttle valve 300 are incorporated in each of the five regions V2 to V6 of the body 11. The directional control valve 100 serves to control the direction of flow of the oil to a corresponding one of the actuators A1 to A6 and to control the flow rate of the oil. The pressure compensation valve 200 serves to compensate for the amount of the oil flowing through the directional control valve 100. The shuttle valves 300 serve to select the greatest (maximum) load pressure among the load pressures acting respectively on the actuators A1 to A6. A similar directional control valve 100 and a similar pressure compensation valve 200 are incorporated in the region V1 disposed immediately adjacent to the end face 11*e* of the body 11.

Construction of the Body 11

Figure 6:
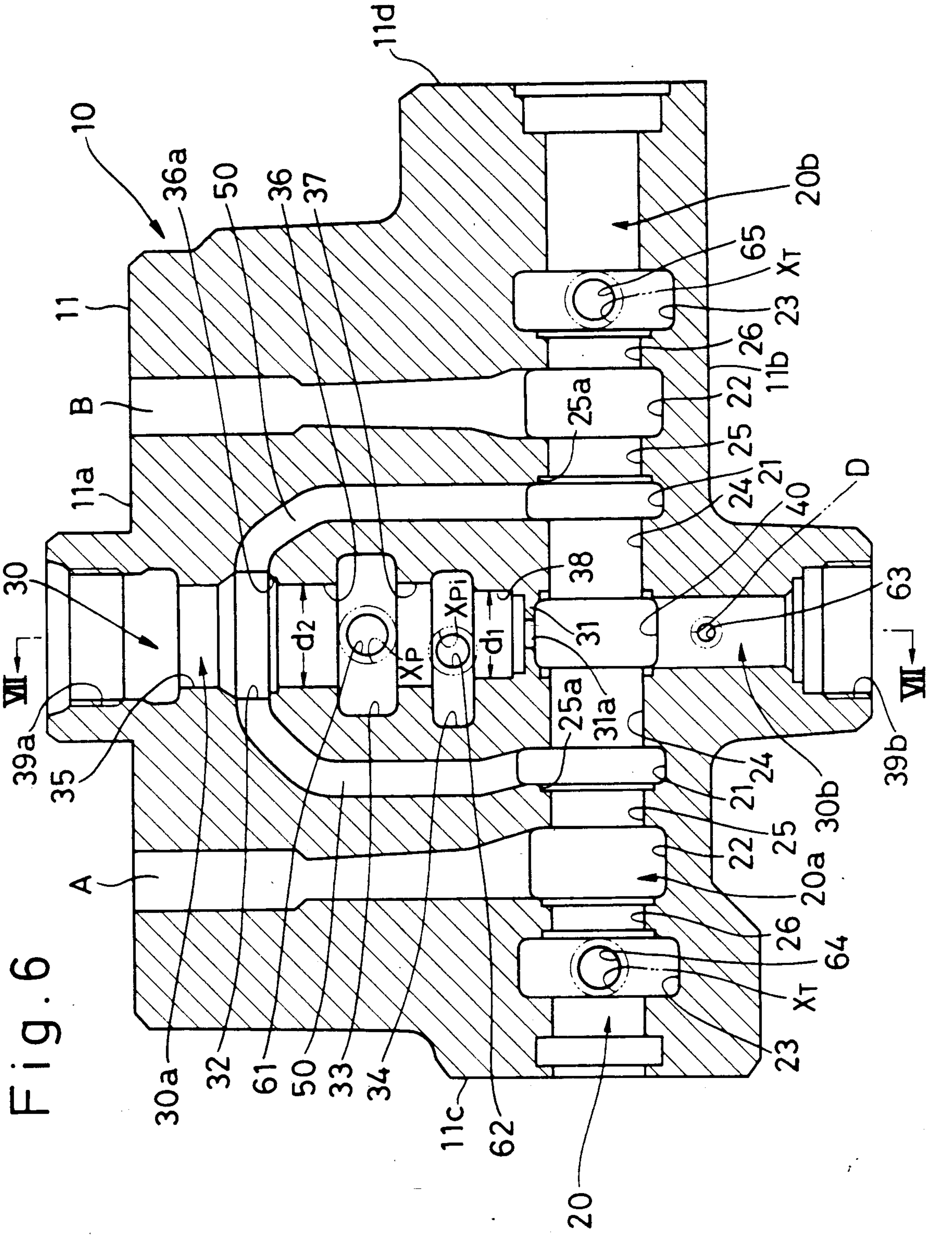
FIG. 6 is a cross-sectional view of the body.

Before explaining the above valves 100, 200 and 300, the construction of the body 11 will now be described. As shown in FIG. 6, each of the regions V1 to V6 of the body 11 has the two actuator ports A and B extending vertically and opening to the upper face 11*a*; a transverse hole 20 horizontally extending straight through the body 11 and opening at its opposite ends to the opposite side faces 11*c* and 11*d* of the body 11; and a vertical hole 30 vertically extending straight through the body 11 and opening at its opposite ends to the upper and lower faces 11*a* and 11*b* of the body 11. The vertical hole 30 perpendicularly intersects a central portion of the transverse hole 20, and a load pressure chamber 40 for receiving load pressure (later described) is provided at this intersection. The vertical hole 30 has an upper portion 30*a* disposed above the load pressure chamber 40, and a lower portion 30*b* disposed below the load pressure chamber 40. The transverse hole 20 is arranged generally symmetrically with respect to the center of the load pressure chamber 40, and left and right portions 20*a* and 20*b* of the transverse hole 20 communicate with the upper portion 30*a* of the vertical hole 30 via respective passages 50 and 50.

At each of the regions V1 to V6, the pair of actuator ports A and B, the transverse hole 20, the vertical hole 30, the load pressure chamber 40 and the two passages 50 and 50 are disposed substantially on a plane disposed perpendicular to the direction of arrangement of the regions V1 to V6.

Each of the left and right portions 20*a* and 20*b* of the transverse hole 20 has three annular grooves 21, 22 and 23 arranged in this order from the load pressure chamber 40. Each of the passages 50 and 50 communicates at its lower end with the corresponding inner annular groove 21. The actuator port A communicates at its lower end with the intermediate annular groove 22 of the left portion 20*a*, and similarly the actuator port B communicates at its lower end with the intermediate annular groove 22 of the right portion 20*b*. The outer annular grooves 23 communicate with tank ports Xt, respectively, as later described. The inner peripheral surface of each of the left and right portions 20*a* and 20*b* has a first guide portion 24 disposed between the load pressure chamber 40 and the annular groove 21, a second guide portion 25 disposed between the annular grooves 21 and 22, and a third guide portion 26 disposed between the annular grooves 22 and 23. Each of the left and right portions 20*a* and 20*b* of the transverse hole 20 has a narrow annular grooves 25*a* disposed immediately adjacent to one end of the guide groove 25 close to the load pressure chamber 40.

An abutment wall 31 is formed on the inner peripheral surface of the vertical hole 30 and disposed above the load pressure chamber 40, and a port 31*a* constituting part of the vertical hole 30 is formed through the abutment wall 31. The upper portion 30*a* of the vertical hole 30 communicates at its lower end with the load pressure chamber 40 via the port 31*a*. The upper portion 30*a* of the vertical hole 30 has three annular grooves 32, 33 and 34 arranged in this order from above. The pair of passages 50 and 50 communicate at their upper ends with the upper annular groove 32. The intermediate annular groove 33 communicates with a pump port Xp as later described. The lower annular groove 34 communicates with a pilot pump port Xpi as later described. The annular grooves 33 and 34 are disposed between the pair of passages 50 and 50. The inner peripheral surface of the upper portion 30*a* of the vertical groove 30 are divided by the three annular grooves 32 to 34 into four guide portions 35 to 38 arranged in this order from above. The inner diameter d1 of the lowermost guide portion 38 is smaller than the inner diameter d2 of the other three guide portions 35 to 37. A narrow annular groove 36*a* is formed in the upper end of the guide portion 36.

The inner diameter of the upper end section of the upper portion 30*a* of the vertical hole 30 is greater than the inner diameter of the guide portion 35, and internal threads 39*a* are formed on the inner periphery of this upper end section.

The inner diameter of the lower end section of the lower portion 30*b* of the vertical hole 30 is greater than the inner diameter than the remainder of the lower portion 30*b*, and internal threads 39*b* are formed on the inner peripheral surface of this lower end section.

Figure 7:
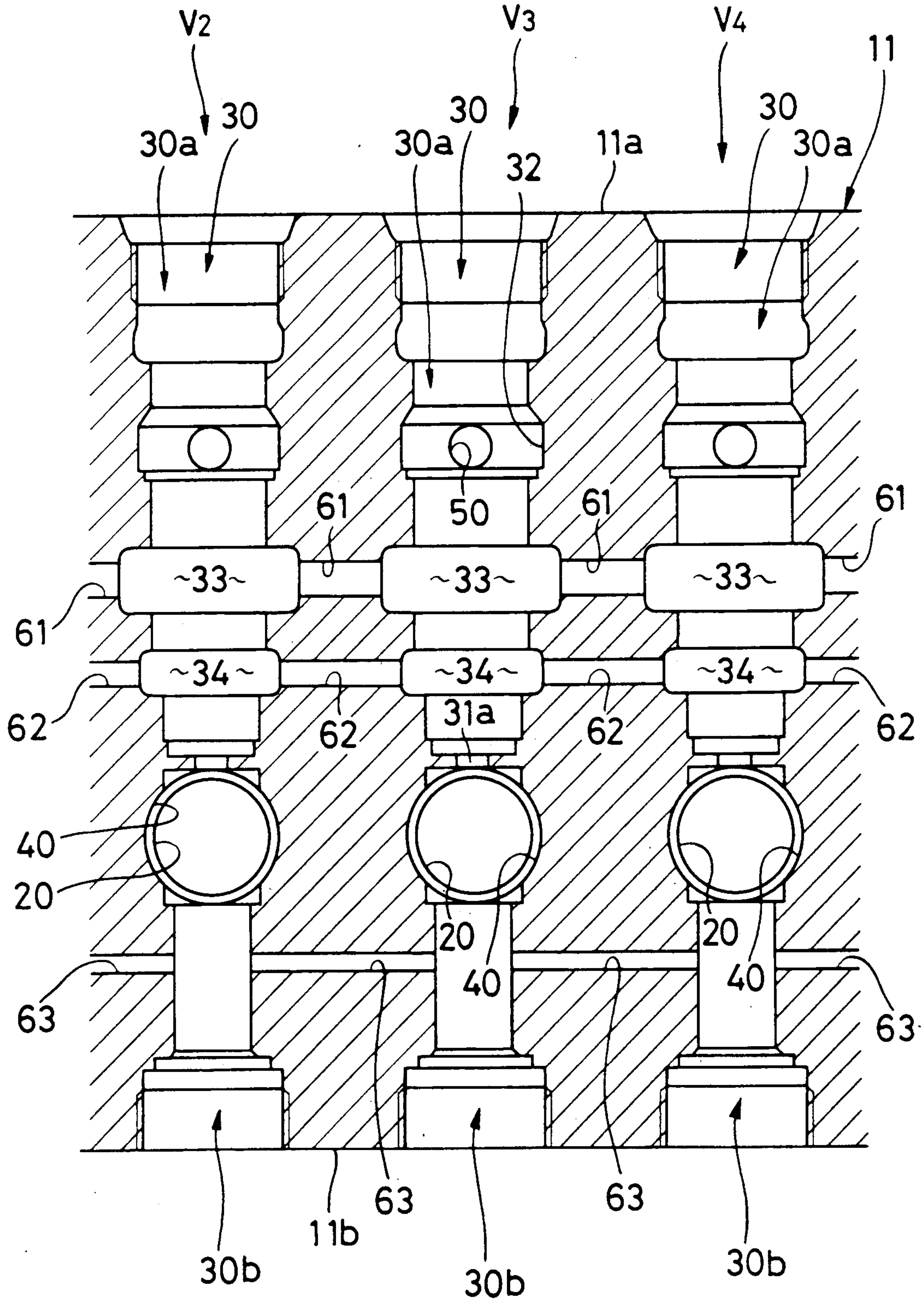
FIG. 7 is a cross-sectional view taken along the line VII—VII of FIG. 6.

As shown in FIGS. 6 and 7, the annular grooves 33 of the upper portions 30*a* of the vertical holes 30 of each adjacent ones of the regions V1 to V6 communicate with each other via a passage 61. The annular groove 33 of the region V6 disposed immediately adjacent to the end face 11*f* of the body 11 communicates via a passage 61 with the pump port Xp formed in the end face 11*f* of the body 11. With this arrangement, the annular grooves 33 of the six regions V1 to V6 all communicate with the pump port Xp.

The annular grooves 34 of each adjacent ones of the regions V1 to V6 communicate with each other via a passage 62. The annular groove 34 of the region V6 disposed immediately adjacent to the end face 11*f* of the body 11 communicates via a passage 62 with the pilot pump port Xpi formed in the end face 11*f* of the body 11. With this arrangement, the annular grooves 34 of the six regions V1 to V6 all communicate with the pilot pump port Xpi.

The lower portions 30*b* of the vertical holes 30 of each adjacent ones of the regions V1 to V6 communicate with each other via a passage 63. The lower portion 30*b* of the region V6 disposed immediately adjacent to the end face 11*f* of the body 11 communicates via a passage 63 with a detection pressure port D formed in the end face 11*f* of the body 11.

The annular grooves 23 of the left portions 20*a* of the transverse holes 20 of each adjacent ones of the regions V1 to V6 communicate with each other via a passage 64. Similarly, the annular grooves 23 of the right portions 20*b* of the transverse holes 20 of each adjacent ones of the regions V1 to V6 communicate with each other via a passage 65. The annular grooves 23 of the region V6 disposed immediately adjacent to the end face 11*f* of the body 11 respectively communicate via respective passages 64 and 65 with the pair of tank ports Xt formed in the end face 11*f* of the body 11.

The six passages 61, the six passages 62, the six passages 63, the six passages 64 and the six passages 65 extend along five straight lines, respectively.

As is clear from FIG. 6, the load pressure chambers 40 of the regions V1 to V6 are disposed independently of one another.

At each of the regions V1 to V6 of the body 11, the directional control valve 100 is received in the transverse hole 20, and the pressure compensation valve 200 is received in the upper portion 30*a* of the vertical hole 30. At each of the regions V2 to V6, the shuttle valve 300 is received in the lower portion 30*b* of the vertical hole 30.

Construction of the Directional Control Valve 100

As shown in FIG. 3, the directional control valve 100 includes a spool 110 which is slidably received in the transverse hole 20 for movement therealong. The spool 110 has at its central portion a land portion 111 received in the load pressure chamber 40. Each of the left and right portions of the spool 110 has two land portions 112 and 113 arranged in this order from the land portion 111 toward the end of the spool 110. The two land portions 112 of the left and right portions of the spool 110 cooperate respectively with the guide portions 25 of the left and right portions 20*a* and 20*b* of the transverse hole 20 to allow and interrupt the communication between the actuator port A and the corresponding passage 50 and the communication between the actuator B and the corresponding passage 50. The two land portions 113 of the left and right portions of the spool 110 cooperate respectively with the guide portions 26 of the left and right portions 20*a* and 20*b* of the transverse hole 20 to allow and interrupt the communication between the actuator port A and the corresponding tank port Xt and the communication between the actuator B and the corresponding tank port Xt. Each of the left and right portions of the spool 110 has an annular recess 114 disposed between the lands 112 and 113, and one end of the land portion 112 disposed immediately adjacent to the recess 114 is tapered as at 112*a* toward the recess 114. This tapered portion 112*a* cooperates with the annular groove 25*a* of the transverse hole 20 to constitute a throttle portion 115. A notch 113*a* is formed in one end of the land 113 disposed immediately adjacent to the recess 114.

Each of the left and right portions of the spool 110 has a passage 120. The passage 120 serves to communicate the load pressure chamber 40 with the actuator port A or the actuator port B when the spool 110 is operated, as will hereinafter be more fully described. Each passage 120 comprises an axial bore 121 extending axially from the end of the spool 110, and small-diameter holes 122 formed through the peripheral wall of the spool 110 and disposed between the land portions 111 and 112, and a stepped hole 123 of a small diameter formed radially through the land portion 113.

The opposite ends of the spool 110 are projected outwardly from the opposite side faces 11*c* and 11*d* of the body 11, respectively. Plugs 130 and 140 are threaded respectively into the ends of the axial holes 121 of the spool 110 at the opposite ends of the spool 110. An operating lever (not shown) is connected to the left end of the spool 110 through the plug 130.

A centering spring mechanism 150 is connected to the right end of the spool 110 through the plug 140. The centering spring mechanism 150 is a known device which holds the spool 110 in its neutral position (shown in FIG. 3) when the above operating lever is in its inoperative condition. The centering spring mechanism 150 comprises a washer 151 engaged with the right end of the spool 110 in the neutral position of the spool 110, a washer 152 engaged with a flange 140*a* of the plug 140 in the neutral position of the spool 110, and a compression spring 153 acting between the two washers 151 and 152. The centering spring mechanism 150 is covered by a cover member 155 fixedly mounted on the side face 11*d* of the body 11.

Operation of the Directional Control Valve 100

The operation of the directional control valve 100 will now be described.

When the above operating lever is in its inoperative condition, the spool 110 is maintained in its neutral position shown in FIG. 3. In this condition, the land portions 112 and 113 of the left portion of the spool 110 are respectively held in contact with the guide portions 25 and 26 over the entire peripheries thereof. Therefore, the left actuator port A is not communicated with the mating passage 50 and the mating tank port Xt. Similarly, the right actuator port B is not communicated with the mating passage 50 and the mating tank portion Xt.

When the spool 110 is thus held in its neutral position, the load pressure chamber 40 is in communication with the tank ports Xt and Xt via the passages 120 and 120, and therefore the pressure in the load pressure chamber 40 is substantially equal to the atmospheric pressure.

When the operating lever is operated to move the spool 110 in a right-hand direction (FIG. 3), the land portion 113 of the left portion of the spool 110 is still kept in contact with the guide portion 26 of the transverse hole 20 over the entire periphery thereof, but the land portion 112 of the left portion of the spool 110 is disengaged from the guide portion 25 to open the throttle portion 115. Therefore, the actuator port A is caused to communicate with the passage 50, but the communication of the actuation port A with the tank port Xt remains interrupted. As a result, the oil under high pressure is fed from the pressure compensation valve 200 via the passage 50, the throttle 115 and the actuator port A to the corresponding actuator. At the same time, the land portion 112 of the right portion of the spool 110 is still kept in contact with the guide portion 25, but the notch 113*a* of the land portion 113 of the right portion of the spool 110 is released from the guide portion 26. Therefore, the actuator port B is caused to communicate with the tank port Xt, but the communication of the actuation port B with the passage 50 remains interrupted. As a result, the oil is fed from the corresponding actuator to a tank T (later described) via the actuator port B and the tank port Xt. Thus, the actuator is driven in one direction.

When the spool 110 is moved in the right-hand direction as described above, the small-diameter hole 123 of the left passage 120 is communicated with the actuator port A but is not communicated with the tank port Xt, so that the load pressure chamber 40 is caused to communicate with the actuator port A via the passage 120. At the same time, the small-diameter ports 122 of the right passage 120 are closed by the guide portion 24, so that the communication between the load pressure chamber 40 and the right tank port Xt is interrupted. Therefore, the load pressure appearing at the actuator port A can be introduced into the load pressure chamber 40.

When the operating lever is operated to move the spool 110 in a left-hand direction (FIG. 3), in contrast with the above, the high pressure oil is fed from the pressure compensation valve 200 to the corresponding actuator via the right passage 50, throttle portion 115 and actuator port B. The oil discharged from this actuator is returned to the tank T via the actuator port A and the tank port Xt. As a result, the actuator is driven in the opposite direction.

When the spool 110 is thus moved in the left-hand direction, the load pressure chamber 40 communicates with the actuator port B via the right passage 120, and is not communicated with the two tank ports Xt. Therefore, the load pressure appearing at the actuator port B can be introduced into the load pressure chamber 40.

When the spool 110 is moved in either the right or left direction as described above so that the high pressure oil flows into the actuator port A or B via the throttle portion 115, the degree of opening of the throttle portion 115 constitutes an important factor for determining the amount of supply of oil to the actuator.

Construction of the Pressure Compensation Valve 200

The construction of the pressure compensation valve 200 will now be described particularly with reference to FIG. 4. The pressure compensation valve 200 includes a balance piston 210. The balance piston 210 comprises an upper member 210A and a lower member 210B connected to the upper member 210A, the balance piston 210 being slidably received in the upper portion 30*a* of the vertical hole 30.

The lower member 210B has five land portions 211 to 215 arranged in this order from above. The diameter of the land portions 211 to 214 is substantially equal to the diameter d2 of the guide portions 35, 36 and 37 of the vertical hole 30 formed in the body 11. The diameter of the land portion 215 is substantially equal to the diameter d1 of the guide portion 38 of the vertical hole 30. The land portions 211 to 215 are always kept in contact with their mating guide holes 35 to 38 of the vertical hole 30. A notch 212*a* is formed in the lower end of the land portion 212, and the notch 212*a* cooperates with the annular groove 36*a*, formed in the guide portion 36, to constitute a throttle portion 216.

An annular recess 220, formed in the outer periphery of the lower member 210B and disposed between the land portions 211 and 212 communicates with the two passages 50 and 50 in the body 11. The guide portion 36 faces an annular recess 221 which is formed in the outer periphery of the lower member 210B and is disposed between the land portions 212 and 213. An annular recess 222, formed in the outer periphery of the lower member 210B and disposed between the land portions 213 and 214, is disposed in the annular groove 33 communicating with the pump port Xp. An annular stepped portion 223, formed on the outer periphery of the lower member 210B and disposed between the land portions 214 and 215 of different diameters, is exposed to the annular groove 34 communicating with the pilot pump port Xpi.

A recess 225 is formed in the lower end face of the lower member 210B of the balance piston 210, and a vibration-absorbing spring 226 is received in the recess 225.

The lower member 210B of the balance piston 210 has an axial hole 230 extending axially downward from the upper end face of the lower member 210B. The axial hole 230 has a lower reduced-diameter portion and an upper greater-diameter portion, and a step 231 is formed between these two portions. The step 231 serves as a valve seat as later described.

Received within the axial hole 230 of the lower member 210B is a load check valve 400 which comprises a valve body 410. The valve body 410 has a slide portion 411 disposed in sliding contact with the greater diameter portion of the axial hole 230, and a head 412 at its lower end. The valve body 410 is urged downward by a relatively weak spring 420 to hold the valve head 412 in sealing contact with the valve seat 231. The axial hole 230 is divided or partitioned by the slide portion 411 of the valve body 410 into two sections.

Holes 232 are formed through the peripheral wall of the lower member 210B of the balance piston 210, and are disposed below the valve seat 231. The axial hole 230 communicates with the pump port Xp via the through holes 232, the annular recess 222 and the annular groove 33 of the body 11. Holes 233 are formed through the peripheral wall of the lower member 210B, and are disposed above and adjacent to the valve seat 231. The axial hole 230 communicates with the annular recess 221 via the through holes 233. A hole 234 of a small diameter is also formed through the peripheral wall of the lower member 210B, and is disposed above the slide portion 411. The axial hole 230 communicates with the two passages 50 and 50 via the hole 234 and the annular recess 220.

The lower end portion of the upper member 210A of the balance piston 210 is threaded into the upper portion of the axial hole 230 of the lower member 210B. The upper member 210A has a peripheral flange 240 intermediate the opposite ends thereof, and the lower surface of the flange 240 abuts against the upper end of the lower member 210B. The upper member 210A has a land portion 241 disposed above the flange 240, the land portion 241 having a diameter d3. The relation of the diameter d3 with respect to the above-mentioned diameters d1 and d2 is as follows:

$$d3 < d1 < d2$$

The upper member 210A also has an axial hole 243 axially extending upwardly from the lower end face thereof, and holes 244 of a small diameter extending transversely from the upper end of the axial hole 243 to the outer peripheral surface of the upper member 210A, the holes 243 being disposed between the land portion 241 and the flange 240.

A cap assembly 250 is mounted in the upper end section of the vertical hole 30 of the body 11. The cap assembly 250 comprises a tubular adapter 251 threaded at its lower portion into the upper end section of the vertical hole 30, a cap-shaped bushing 252 received in the adapter 251, and a pipe fitting 253 threaded at its lower portion into the upper portion of the adapter 251 and held at its lower end face against a projection 252*a* formed on the upper end of the bushing 252. The land portion 241 of the upper member 210A of the balance piston 210 is slidably received in the bushing 252.

The pipe fitting 253 is has an axial hole C into which a pipe (not shown) is fitted. The axial hole C serves as a control pressure port for introducing a control pressure as later described. The pipe fitting 253 also has a hole 253*a* extending downward from the lower end of the control pressure port C to the lower end face of the pipe fitting 253. A hole 252*b* is formed through the upper wall of the bushing 252.

The pressure compensation valve 200 has four important pressure introduction chambers Ypc, Yps, Ypi and Ypa arranged in this order from above.

The uppermost or first pressure introduction chamber Ypc is formed between the upper wall of the bushing 252 and the land portion 241 of the balance piston 210. A control pressure Pc is fed from the control pressure port C to the pressure introduction chamber Ypc via the hole 253*a* of the pipe fitting 253, a space formed between the lower end face of the pipe fitting 253 and the upper end face of the bushing 252 and the hole 252*b* of the bushing 252.

The second pressure introduction chamber Yps is formed by the upper end section of the vertical hole 30 of the body 11 which is closed by the cap assembly 250. A supply pressure Ps supplied from the pressure compensation valve 200 to the directional control valve 100 (that is, the pressure in the passages 50) is introduced into the pressure introduction chamber Yps via the hole 234, a space between the upper member 210A of the balance piston 210 and the valve member 410 of the load check valve 400, the axial hole 243 and the holes 244.

The third pressure introduction chamber Ypi is formed by the annular groove 34 and the outer peripheral surface of the balance piston 210. A pilot pump pressure Pi is fed from the pilot pump port Xpi to the pressure introduction chamber Ypi.

The fourth or lowermost pressure introduction chamber Ypa is formed by the recess 225 of the balance piston 210 and the abutment wall 31. A load pressure Pa from the load pressure chamber 40 is introduced into the pressure introduction chamber Ypa via the through hole 31*a*.

Operation of the Pressure Compensation Valve 200

When a main pump P later described is driven to apply a pump pressure P to the lower end portion of the axial hole 230 of the balance piston 210 from the pump port Xp of the body 11 via the annular groove 33 and the holes 232 of the balance piston 210, the valve body 410 of the load check valve 400 is urged upward and opened.

Figure 4:
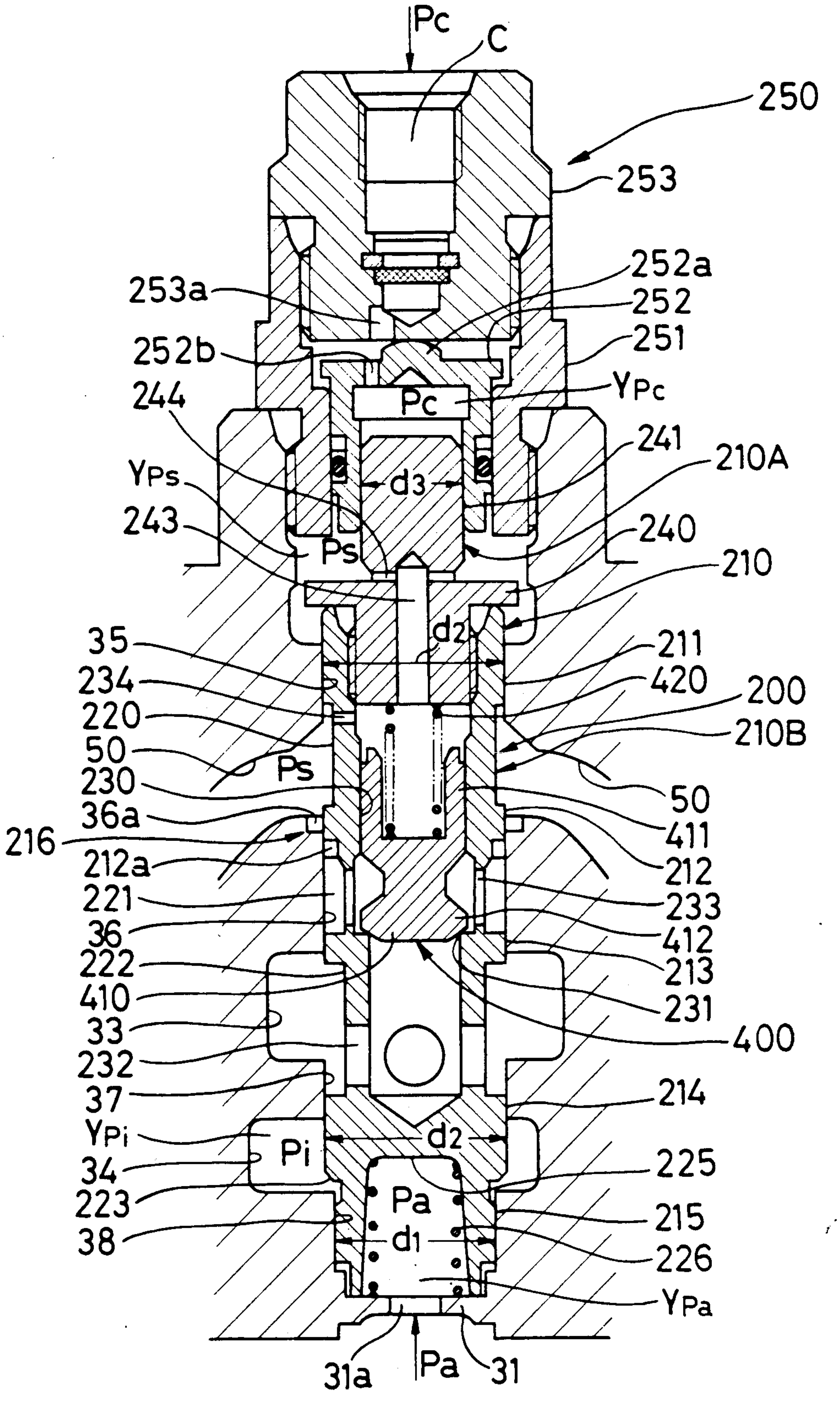
FIG. 4 is an enlarged cross-sectional view of the body, showing a pressure compensation valve.

When the balance piston 210 is in its lowermost position as shown in FIG. 4, the land portion 212 is disposed in contact with the guide portion 36 of the vertical hole 30 over the entire periphery thereof to close the throttle portion 216. Therefore, in this condition, the passages 50 are not in communication with the pump port Xp. When the balance piston 210 moves upward a predetermined amount, the throttle portion 216 is opened. The degree of opening of the throttle portion 216 increases as the balance piston 210 further moves upward.

Next, the forces to be applied to the balance piston 210 will now be described. The spring 226 is designed to absorb vibrations, and the force exerted by the spring 226 on the balance piston 210 is so small that it can be disregarded. Although the pump pressure P is applied from the pump port Xp to the land portions 213 and 214 via the annular groove 33 of the body 11, the forces acting respectively on the land portions 213 and 214 cancel each other since the pressure receiving areas of these two land portions 213 and 214 are equal to each other. The pump pressure P also urges the valve body 410 of the load check valve 400 upward, and is applied to the land portions 212 and 213 via the holes 233 and the annular recess 221. However, the forces acting respectively on the land portions 212 and 213 cancel each other since the pressure receiving areas of these two land portions 212 and 213 are equal to each other. Therefore, the forces exerted by the pump pressure P directly on the balance piston 210 are disregarded.

The load pressure Pa introduced into the pressure introduction chamber Ypa and the pilot pump pressure Pi introduced into the pressure introduction chamber Ypi act to urge the balance piston 210 upward so as to open the throttle portion 216. The supply pressure Ps introduced into the pressure introduction chamber Yps and the control pressure Pc introduced into the pressure introduction chamber Ypc act to urge the balance piston 210 downward so as to close the throttle portion 216.

Next, the effective pressure receiving areas of the balance piston 210 at the pressure introduction chambers Ypc, Yps, Ypi and Ypa will now be described. The effective pressure receiving area Spa of the balance piston 210 at the pressure introduction chamber Ypa is determined by the diameter d1 of the land portion 215 of the balance piston 210. The effective pressure receiving area Spi of the balance piston 210 at the pressure introduction chamber Ypi is determined by the difference between the diameter d2 of the land portion 214 and the diameter d1 of the land portion 215. The effective pressure receiving area Sps of the balance piston 210 at the pressure introduction chamber Yps is determined by the difference between the diameter d2 of the land portion 211 and the diameter d3 of the land portion 241. The effective pressure receiving area Spc of the balance piston 210 at the pressure introduction chamber Ypc is determined by the diameter d3 of the land portion 241. These are expressed by the following formulas:

$$Spa=\pi d1^2/4$$

$$Spi=\pi(d2^2-d1^2)/4$$

$$Sps=\pi(d2^2-d3^2)/4$$

$$Spc=\pi d3^2/4$$

Therefore, the force Of urging the balance piston 210 to move in the direction to open the throttle portion 216 can be represented by the following formula:

$$Of=(Pa\times Spa)+(Pi\times Spi) \quad (1)$$

The force Fd urging the balance piston 210 to move in the direction to close the throttle portion 216 can be represented by the following formula:

$$Fd=(Ps\times Sps)+(Pc\times Spc) \quad (2)$$

The position of the balance piston 210 (and hence the degree of opening of the throttle portion 216 of the pressure compensation valve 200) is determined in such a manner that the opening force Of and the closing force Fd are equal to each other.

In this embodiment, the relation of the effective pressure receiving areas is represented by the following formula:

$$Spa=Sps>Spi=Spc \quad (3)$$

Next, the operation of the pressure compensation valve 200 will now be described from the viewpoint of its pressure compensation function. As described above, the position of the balance piston 210 is determined in such a manner that the formula (Of=Fd) is established. From the above formulas (1), (2) and (3), the formula (Of=Fd) can be expressed as follows:

$$Ps-Pa=K\,(Pi-Pc) \quad (4)$$

where K is equal to (Spi/Spa).

Thus, it will be appreciated from the formula (4) that the position of the balance piston 210 (and hence the degree of opening of the throttle portion 216) is so controlled that the difference (Ps−Pa) between the supply pressure and the load pressure can be maintained at K (Pi−Pc).

Next, the operation of the pressure compensation valve 200 will now be described more specifically. When the degree of opening of the throttle portion 115 corresponding to the actuator port A or the actuator port B increases in accordance with the movement of the spool 110 of the directional control valve 100, the balance piston 210 is moved upward so as to increase the degree of opening of the throttle portion 216. As a result, the flow rate (flow amount per unit time) of the throttle portion 115 is increased so that the above pressure difference (Ps−Pa) can be kept at K (Pi−Pc), thereby increasing the amount of supply of the oil to the corresponding actuator. In contrast, when the degree of opening of the throttle portion 115 of the directional control valve 100 is decreased, the degree of opening of the throttle portion 216 of the pressure compensation valve 200 is decreased, thereby decreasing the amount of supply of the oil to the corresponding actuator. Thus, in accordance with the amount of the operation of the directional control valve 100, the amount of supply of the oil to the actuator and hence the speed of driving of the actuator can be controlled.

When the load of the corresponding actuator increases to increase the load pressure Pa, the degree of opening of the throttle portion 216 increases so as to increase the supply pressure Ps, thereby maintaining the difference between the two pressures Ps and Pa at K (Pi−Pc). In contrast, when the load of the actuator decreases to decrease the load pressure Pa, the degree of opening of the throttle portion 216 is decreased so as to decrease the supply pressure Ps. With this arrangement, irrespective of variations in the load of the actuator, the amount of supply of the oil to the actuator per unit time (and hence the speed of driving of the actuator) in accordance with the amount of the operation of the directional control valve 100 can be maintained in a stable manner.

Construction of the Shuttle Valve 300

Figure 5:
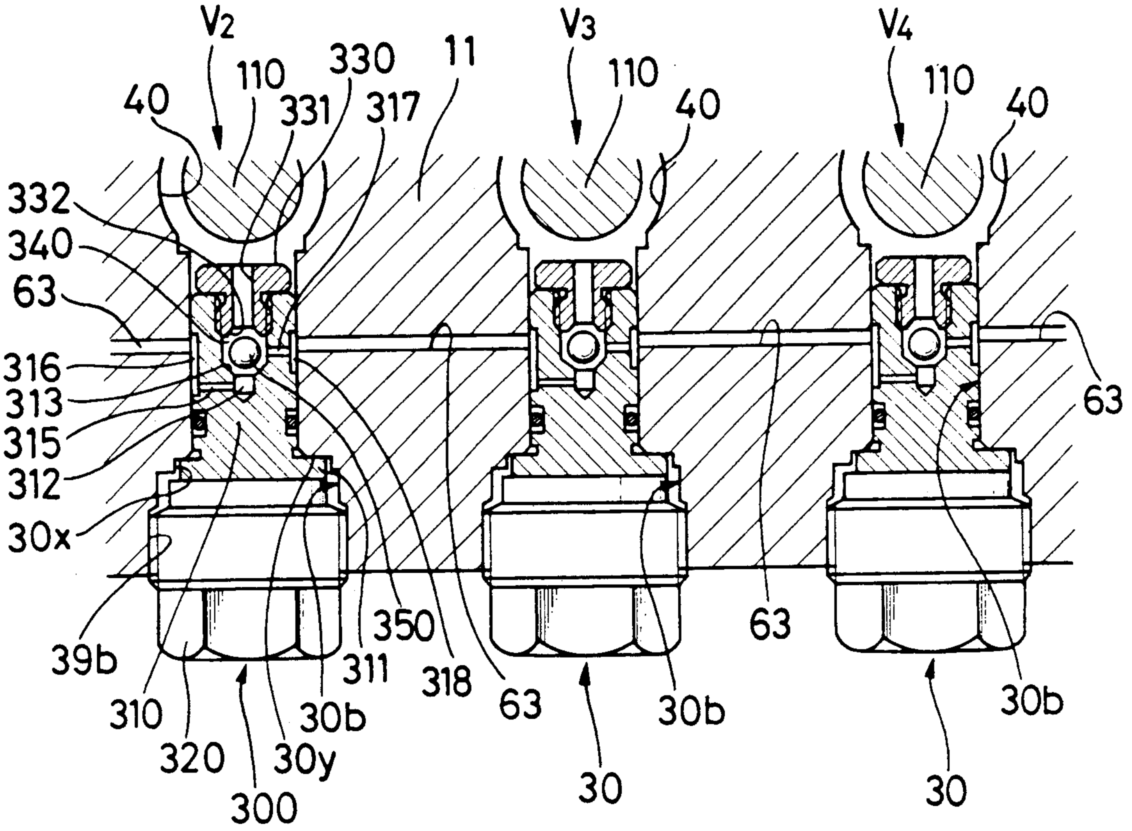
FIG. 5 is a cross-sectional view of the body taken through a plane perpendicular to the sheet of FIG. 3, showing shuttle valves.

Next, the shuttle valve 300 will now be descried. As best shown in FIG. 5, the shuttle valve 300 includes a holder 310 received oil-tight in the lower portion 30*b* of the vertical hole 30. The holder 310 has a peripheral flange 311 eccentric from the axis of the holder 310. The flange 311 is received in a counterbore 30*x* provided at the lower portion 30*b* of the vertical hole 30, the counterbore 30*x* being eccentric from the axis of the vertical hole 30. With this arrangement, the holder 310 is received in position in the lower portion 30*b* of the vertical hole 30. A plug 320 is threaded into the threaded portion 39*b* provided at the lower end of the lower portion 30*b*. The plug 320 urges the flange 311 of the holder 310 against a stepped portion 30*y* formed on the inner peripheral surface of the vertical hole 30, thereby holding the holder 310 against movement.

The holder 310 has an axial stepped hole 312 extending downward from its upper end face. A tapered shoulder or step 313 formed on the inner peripheral surface of the axial hole 312 serves as a first valve seat. A valve seat member 330 is threaded into the upper end portion of the axial hole 312, the valve seat member 330 having an axial hole 331 (first inlet port) formed therethrough. A tapered lower surface 332 of the valve seat member 330 serves as a second valve seat. That portion of the axial hole 312 disposed between the second valve seat 332 and the first valve seat 313 serves as a valve chamber 340. A valve member 350 in the form of a ball is received within the valve chamber 340.

The valve chamber 340 communicates with the load pressure chamber 40 via the axial hole 331 of the valve seat member 330. The valve chamber 340 is also connected to the left-hand passage 63 (FIG. 5) via a transverse hole 315 (which is formed in the holder 310 and extends between the lower end of the axial hole 312 and the outer peripheral surface of the holder 310) and an axial groove 316 formed in the outer peripheral surface of the holder 310. The transverse hole 315 and the axial groove 316 jointly provide a second inlet port. The valve chamber 340 is also connected to the right-hand passage 63 via a transverse hole 317, formed in the holder 310, and an axial groove 318 formed in the outer peripheral surface of the holder 310. The transverse hole 317 and the vertical groove 318 jointly provide an outlet port.

The shuttle valves 300 are incorporated or contained respectively in the five regions V2 to V6 of the body 11. The other region V1 disposed adjacent to the end face 11*e* of the body 11 does not need the shuttle valve 300, and therefore the lower end of the vertical hole 30 of the region V1 is closed by a closure member instead of the shuttle valve 300.

At the region V1, the vertical hole 30 may not open to the lower face 11*b* of the body 11. Also, at the region V1, the shuttle valve 300 may be mounted in the lower portion 30*b* of the vertical hole 30 as described above for the other five regions V2 to V6, in which case the shuttle valve 300 at the region V1 does not make a comparison between two pressures as described later but merely passes the pressure of the load pressure chamber 40 to the right-hand passage 63.

Operation of the Shuttle Valve 300

In each of the shuttle valves 300, the oil pressure fed to this shuttle valve 300 via the left-hand passage 63 from the adjacent shuttle valve 300 disposed on the left side thereof is compared with the load pressure Pa of the load pressure chamber 40 to which the shuttle valve 300 is exposed. In other words, if the pressure fed from the left-hand passage 63 is higher than the load pressure Pa, the valve member 350 moves upward into contact with the second valve seat 332, so that the valve chamber 340 is communicated with the passage 63 and that the communication of the valve chamber 340 with the load pressure chamber 40 is interrupted. As a result, the pressure of the left-hand passage 63 is fed to the right-hand passage 63 via the valve chamber 340. In contrast, if the load pressure Pa is higher than the pressure of the left-hand passage 63, the valve member 350 moves downward into contact with the first valve seat 313, so that the valve chamber 340 is communicated with the load pressure chamber 40 and that the communication of the valve chamber 340 with the left-hand passage 63 is interrupted. As a result, the load pressure Pa is fed to the right-hand passage 63 via the valve chamber 340.

In this manner, the maximum or greatest load pressure PI among the load pressures Pa introduced respectively into the six regions V1 to V6 is outputted from the detection pressure port D connected to the shuttle valve 300 of the final stage (that is, the shuttle valve 300 disposed adjacent to the end face 11*f* of the body 11).

Construction of the Unload and Relief Valve Device 600

Figure 8:
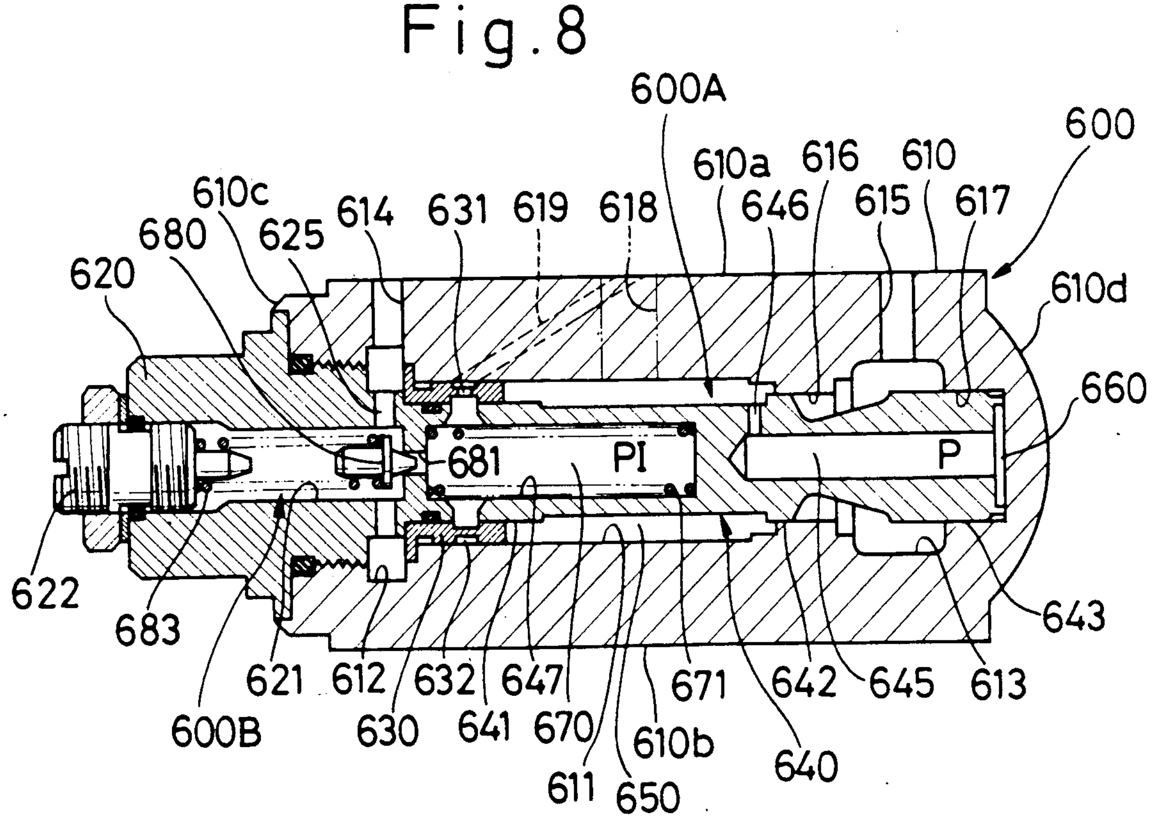
FIG. 8 is a cross-sectional view of an unload and relief valve device.

Next, the unload and relief valve device 600 mounted in stacked relation to the body 11 will now be described with reference to FIG. 8. The unload and relief valve device 600 includes a body 610 in the form of a unitary block. The body 610 has opposite parallel side faces 610*a* and 610*b* which are substantially flat, and opposite end faces 610*c* and 610*d*. The body 610 is mounted in stacked relation to the body 11, with the side face 610*a* abutted against the end face 11*f* of the body 11.

The body 610 has an axial hole 611, and one end of the axial hole 61-1 is closed while the other end of the axial hole 611 is open to the end face 610*c* of the body 610. A plug 620 is threaded into the open end of the axial hole 611. Annular grooves 612 and 613 are formed in the inner peripheral surface of the axial hole 611, and are disposed respectively adjacent to the opposite ends of the axial hole 611. The annular grooves 612 and 613 communicate respectively with the tank ports Xt of the body 11 via respective passages 614 and 615 formed in the body 610. The annular grooves 612 and 613 also communicate with a single tank port (not shown) formed in the upper surface of the body 610 which is substantially parallel to the sheet of FIG. 8. This tank port is connected to a tank T (FIG. 9) via a pipe.

The inner peripheral surface of the axial hole 611 has guide portions 616 and 617 which are disposed on the opposite sides of and immediately adjacent to the annular groove 613. A tubular guide member 630 is fixedly fitted in the axial hole 611, and is disposed on the right side (FIG. 8) of and immediately adjacent to the annular groove 612.

An unload valve 600A is received within the axial hole 611. The unload valve 610A comprises a spool 640 which has three land portions 641, 642 and 643 arranged in this order from the left (FIG. 8). The left-hand land portion 641 is always held in contact with the right-hand end portion of the inner peripheral surface of the guide member 630. The right-hand land portion 643 is always held in contact with the guide portion 617. The intermediate land portion 642 is brought into and out of contact with the guide portion 616, depending on the position of the spool 640.

A pump pressure chamber 650 is defined by the inner peripheral surface of the axial hole 611, the outer peripheral surface of the spool 640, the guide portion 616 and the guide member 630. The pump pressure chamber 650 is connected to the pump ports Xp of the body 11 via a passage 618 formed in the body 610. The pump pressure chamber 650 also communicates with a pump port (not shown) formed in the upper surface of the body 610. This pump port in the body 610 is connected to the main pump P (FIG. 9) via a pipe.

A pilot chamber 660 is formed between the right end face of the spool 640 and the right end wall of the body 610. The pilot chamber 660 communicates with the pump pressure chamber 650 via an axial hole 645 (which is formed in the right end portion of the spool 640) and a hole 646 of a small diameter extending between the axial hole 645 and the outer peripheral surface of the spool 640. Therefore, the pump pressure of the main pump P is introduced into the pilot chamber 660.

Another axial hole 647 is also formed in the left end portion of the spool 640. A pressure introduction chamber 670 is defined by the axial hole 647, the inner peripheral surface of the guide member 630 and the right end of the plug 620. A spring 671 is received within the pressure introduction chamber 670, and urges the spool 640 in a right-hand direction. The pressure introduction chamber 670 is connected to the detection pressure port D of the body 11 via an orifice 631 formed through the peripheral wall of the guide member 630, an annular groove 632 in the outer peripheral surface of the guide member 630 and a passage 61 9 formed in the body 610. Therefore, the aforesaid maximum load pressure PI detected by the shuttle valve 300 is introduced into the pressure introduction chamber 670.

An axial hole 621 is formed in the plug 620 and is open to the left end face of the plug 620. A relief valve 600B is received within the axial hole 621. More specifically, a set screw 622 is threaded into the left end portion of the axial hole 621. The axial hole 621 communicates with the annular groove 612 via holes 625 of a small diameter formed through the peripheral wall of the plug 620. The axial hole 621 also communicates with the pressure introduction chamber 670 via a valve port 681 formed through the right-hand end wall of the plug 620. The valve port 681 is opened and closed by a valve member 680 received within the axial hole 621 A spring 683 is also received within the axial hole 621, and urges the valve member 680 toward the valve port 681 to close the same.

The annular groove 632 in the outer periphery of the guide member 630 is connected to a detection pressure port (not shown) formed in the upper surface of the body 610, and this detection pressure port in the body 610 is connected via a pipe to one of input ports of a pressure differential detector 810 later described.

The body 610 has a passage connected at one end to the pilot pump port Xpi of the body 11, and the other end of this passage is connected via a pipe to a pilot pump Pi later described.

As described above, the ports Xp, Xpi, Xt and D of the body 11 are connected respectively to the main pump P, the pilot pump port Pi, the tank T and the pressure differential detector 810 via the respective passage means (formed in the body 610) and pipes.

Operation of the Unload and Relief Valve Device 600

In the unload valve 600A, the degree of opening between the land portion 642 and the guide portion 616 is so controlled that the left-directed force due to the pump pressure introduced into the pilot chamber 660 is balanced with the right-directed force due to the maximum load pressure (introduced into the pressure introduction chamber 670) and the force of the spring 671. Therefore, the pump pressure P is controlled so as to satisfy the following formula:

$$P = Pl + \Delta P \quad (5)$$

where ΔP represents the resilient force of the spring 671 in terms of pressure.

However, as later described, when the total amount of the oil required by the actuators per unit time exceeds the ability of the main pump P to output the oil so that the pressure P of the main pump P decreases, the land portion 642 is brought into contact with the guide portion 616 to close the unload valve 600A. At this time, the difference between the pump pressure P and the maximum load pressure Pl becomes less than ΔP.

Also, when the maximum load pressure Pl exceeds the relief pressure Pr determined by the spring 683 of the relief valve 600B, the valve member 680 is moved to the left to open the valve port 681. Therefore, the pressure in the pressure introduction chamber 670 will not be above the relief pressure Pr. Therefore, the maximum value Pmax of the pump pressure is determined by the following formula:

$$Pmax = Pr + \Delta P$$

Therefore, in this case, also, the difference between the pump pressure Pmax and the maximum load pressure Pl is less than ΔP.

Construction of the Hydraulic Control System

Figure 9:
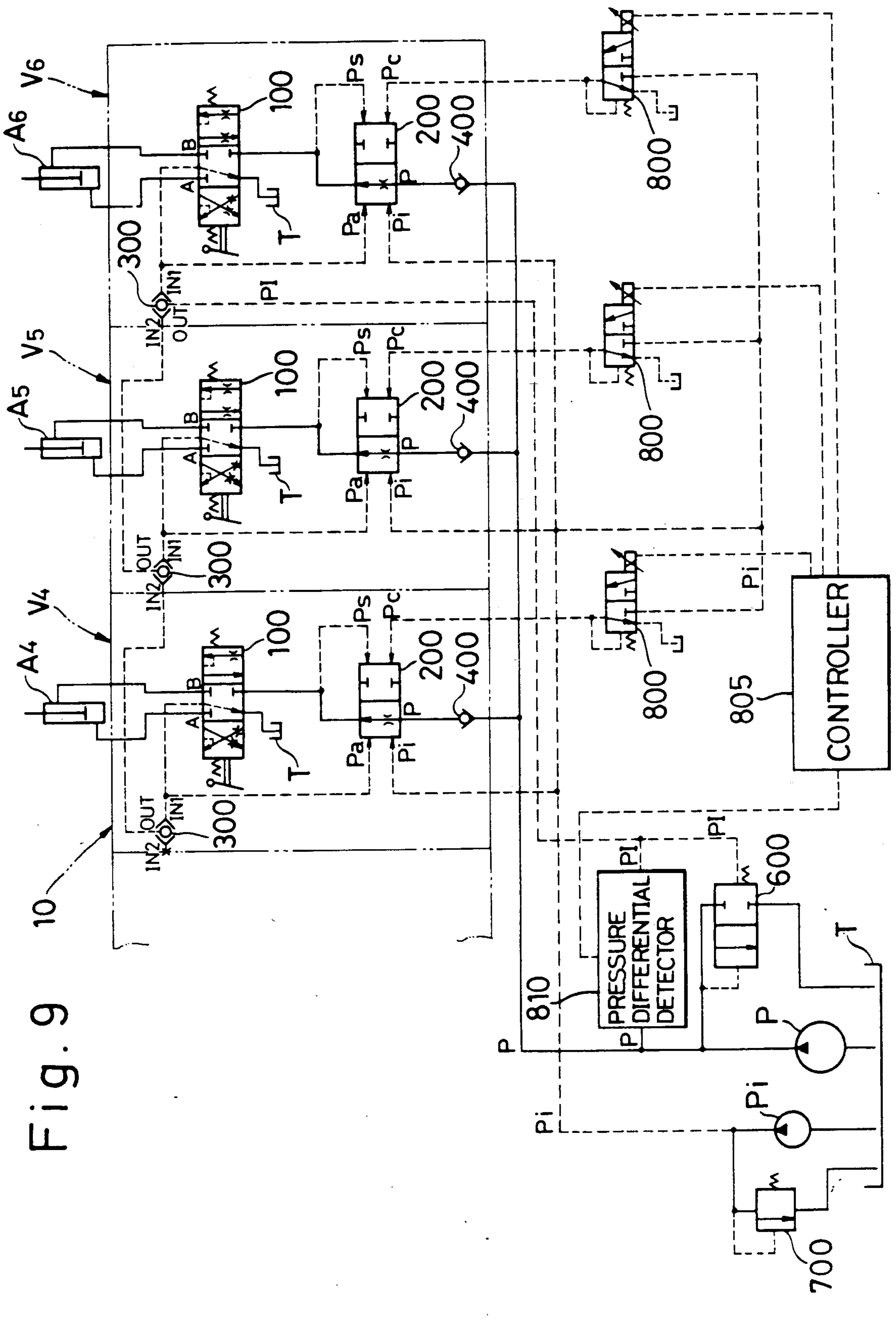
FIG. 9 is a diagram of a hydraulic circuit of the hydraulic control system.

Next, the overall construction of the hydraulic control system including the hydraulic control apparatus 10 will now be described with reference to FIG. 9. In addition to the above-mentioned devices, the hydraulic system further comprises the following devices. A relief valve 700 is connected to the outlet side of the pilot pump Pi, and the pilot pump pressure Pi fed from the pilot pump Pi is maintained at a constant level. Electromagnetic proportional pressure control valves 800 corresponding in number to the actuators A1 to A6 are connected via pipes respectively to the control pressure ports C of the regions V1 to V6 of the hydraulic control apparatus 10. The hydraulic control system further comprises pressure differential detector 810, and a controller 805 which is responsive to a detection signal from the pressure differential detector 810 to control the electromagnetic proportional pressure control valves 800.

Operation of the Hydraulic Control System

The pressure differential detector 810 detects the difference between the pump pressure P and the maximum load pressure Pl. The controller 805 controls the electromagnetic proportional pressure control valves 800 in accordance with the thus detected pressure differential (P−Pl), so that the valves 800 respectively output the control pressure Pc, represented by the following formula, to the control pressure ports C of the regions V1 to V6:

$$Pc = Pi - (P - Pl) \quad (6)$$

From the formula (6), the above formula (4) can be expressed as follows:

$$Ps - Pa = K\,(P - Pl) \quad (7)$$

As is clear from the formula (7), each pressure compensation valve 200 controls so that the difference between the supply pressure Ps and the load pressure Pa is proportional to the difference between the pump pressure P and the maximum load pressure Pl.

When the total amount of the oil required by the actuators A1 to A6 per unit time is less than the ability of the main pump P to output the oil and at the same time when the maximum load pressure Pl is lower than the relief pressure Pr of the relief valve 600B (FIG. 8), the pump pressure P is so controlled by the unload valve 600A as to be higher than the maximum load pressure Pl by the pressure ΔP corresponding to the resilient force of the spring 671, as indicated in the above formula (5). Therefore, the formula (7) can be expressed as follows:

$$Ps - Pa = K\Delta P \quad (8)$$

As is clear from the formula (8), in each of the pressure compensation valves 200 corresponding respectively to the actuators, the pressure difference between the supply pressure Ps and the load pressure Pa is controlled to the constant level K·ΔP. By doing so, the amount of supply of the oil to the actuator per unit time is maintained at a level corresponding to the degree of opening of the throttle portion 115 of the directional control valve 100. As a result, the speed of driving of the actuator is kept at a level corresponding to the amount of the operation of the spool 110.

When the total amount of the oil required by the actuators A1 to A6 per unit time exceeds the ability of the main pump P to output the oil so that the pressure P of the main pump P decreases, the unload valve 600A is closed, but the difference between the pump pressure P and the maximum load pressure Pl is less than above-mentioned ΔP.

Therefore, the pressure differences (Ps−Pa) in all of the pressure compensation valves 200 becomes less than K·ΔP, and as a result the amounts of supply of the oil to all of the actuators in their driving condition per unit time decrease, so that the speeds of driving of the actuators are decreased at the same rate. As described above, the total amount of the oil required by the actuators in their driving condition is limited, thereby ensuring that all of the pressure compensation valves 200 can continue to properly perform their functions. As a result, not only the actuators under low load but also the actuators under high load can properly operate in a well balanced manner.

Also, when the load of any one of the actuators A1 to A6 increases so that the maximum load pressure Pl exceeds the relief pressure Pr of the relief valve 600B, the pump pressure P controlled by the unload valve 600A ceases to vary in response to the maximum load pressure PI and is kept at the maximum pump pressure Pmax. The control pressure Pc at this time is expressed by the following formula derived from the formula (6):

$$Pc = Pi - (Pmax - PI) \quad (9)$$

From the formula (9), the formula (4) can be expressed as follows:

$$Ps - Pa = K\,(Pmax - PI) \quad (10)$$

(Pmax−PI) in the formula (10) is less than the above constant value ΔP, and decreases as the maximum load pressure PI increases. Therefore, in this case, also, the pressure difference (Ps−Pa) in the pressure compensation valve 200 becomes small, and hence the amount of supply of the oil to the actuators per unit time becomes small.

In the pressure compensation valve corresponding to the actuator subjected to the maximum load pressure PI, PI is equal to Pa (PI=Pa). Therefore, the formula (7) can be expressed as follows:

$$Ps - PI = K\,(P - PI) \quad (11)$$

In this formula (11), K is less than 1 (K<1), and therefore it is clear that the supply pressure Ps is always less than the pump pressure P. This means that even the throttle portion 216 of the pressure compensation valve corresponding to the actuator subjected to the maximum load pressure, like the throttle portions 216 of the other pressure compensation valves 200, is not fully opened, thus always ensuring its throttle function.

The controller 805 has means by which the outputs of the electromagnetic proportional pressure control valves 800 can be manually set at respective individual values. With this arrangement, when necessary, the value of the control pressure Pc, outputted from a selected one of these valves 800, is set at zero, so that the throttle portion 216 of the corresponding pressure compensation valve 200 is fully opened, thereby releasing the function of this pressure compensation valve 200.

Advantages of the Hydraulic Control System

In the hydraulic pressure control system, the load pressure chamber 40 is provided at the intersection between the vertical hole 30 and the transverse hole 20, and the pressure compensation valve 200 and the shuttle valve 300 are mounted respectively in the upper and lower portions 30*a* and 30*b* of the vertical hole 30. Both of the pressure compensation valve 200 and the shuttle valve 300 are exposed to the load pressure chamber 40. With this arrangement, the construction of the hydraulic pressure control system is quite simplified. In addition, the transverse hole 20, the vertical hole 30 and the pair of passages 50 and 50 in each of the regions V1 to V6 of the body 11 is disposed substantially on the plane disposed perpendicular to the direction of arrangement of the regions V1 to V6 of the body 11. The directional control valve 100, the pressure compensation valve 200 and the shuttle valve 300 at any one of the regions V1 to V6 are disposed on the above plane. With this arrangement, the hydraulic control apparatus 10 can be very compact in construction.

Modifications of the Invention

Figure 10:
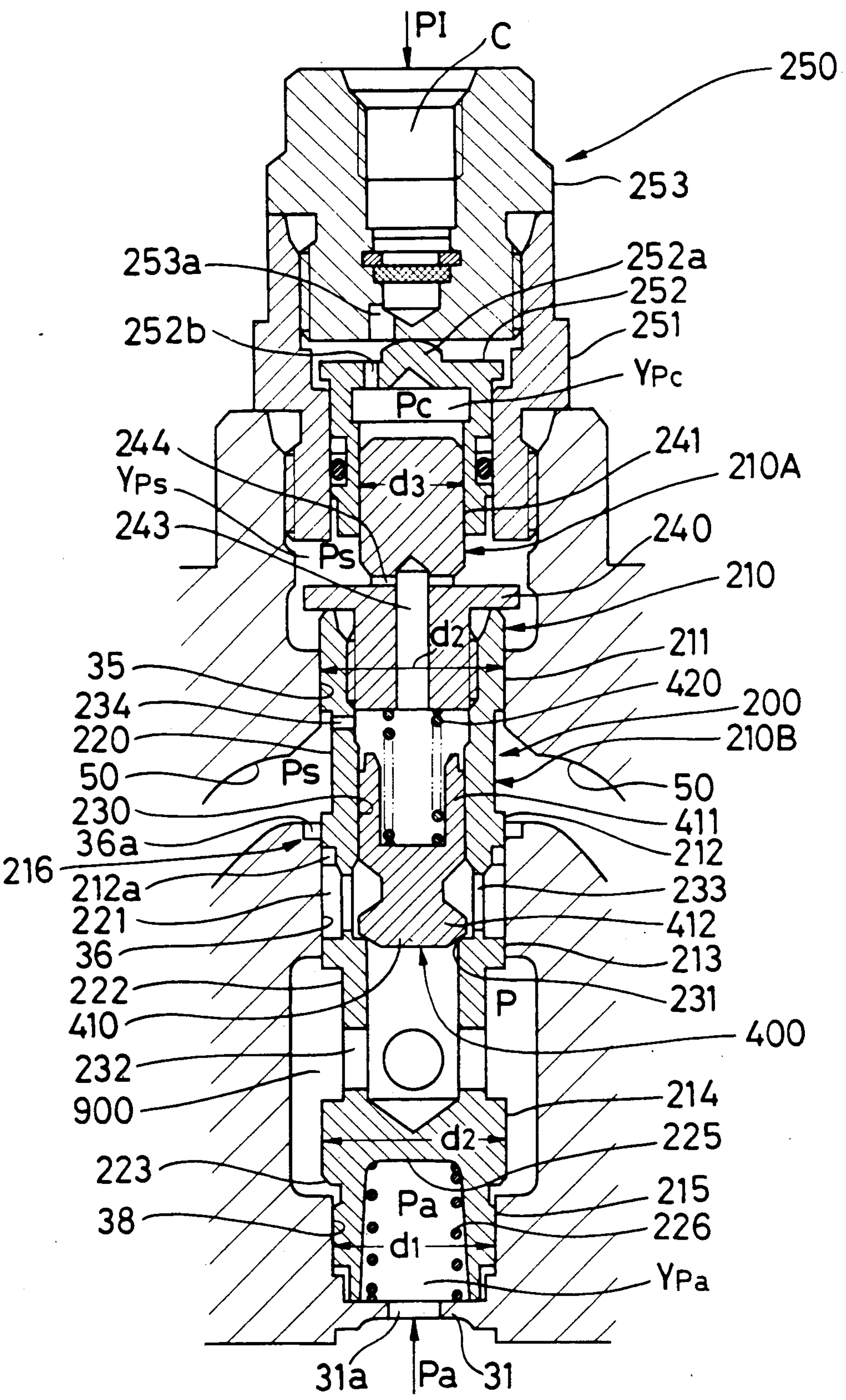
FIG. 10 is a view similar to FIG. 4, but showing a modified form of the invention.

As shown in FIG. 10, the main pump pressure P may be introduced into each pressure introduction chamber 900 to which the step 223 of the balance piston 210 is exposed, and the maximum load pressure PI may be introduced directly into the corresponding port C via a pipe. With this arrangement, the pressure compensation valve 200 operates so that the above formula (7) can be established. Those parts of FIG. 10 corresponding to those of FIG. 4 are designated by identical reference numerals, respectively, and will not be described further here. The embodiment of FIG. 10 obviates the need for the electromagnetic proportional control valves 800 and the controller 805 of the preceding embodiment. According to another modified form of the invention, each port C may be omitted in the embodiment of FIG. 10, in which case the maximum load pressure PI is introduced into the pressure introduction chamber Ypc via a passage formed in the body 11.

Instead of the constant pressure Pi, the pressure (P−PI) from the electromagnetic proportional pressure control valve 800 (FIG. 9) may be introduced into the pressure introduction chamber Ypi, in which case the pressure introduction chamber Ypc is omitted or is communicated with the atmosphere.

In the case where the hydraulic control system includes two actuators, only one shuttle valve may be used.

Further, the body 610 of the unload and relief valve device 600 may be integral with the body 11.

The regions V1 to V6 of the body 10 may be formed respectively by separate blocks, in which case these separate blocks are connected together in stacked relation to one another.

According to a further modified form of the invention, check valves may be used as detection valves instead of the shuttle valves. Since each check valve is similar in construction to each shuttle valve 300 shown in FIG. 5, the check valves are not shown here, and instead will now be described with reference to FIG. 5. Instead of the axial grooves 313 and 318, a groove is formed in the outer peripheral surface of each holder 310 either over the entire periphery or about a half of the periphery of the holder 310, holes 317 and 315 communicating with this groove. Each adjacent passages 63 and 63 are connected together via this groove. The check valves are received respectively in the lower portions 30*b* of all the regions V1 to V6 corresponding respectively to the actuators. A valve member 350 of the check valve which receives the maximum load pressure from the load pressure chamber 40 is engaged with a first valve seat 313, and the maximum load pressure is applied to all of the other check valves via the passages 63. Therefore, in each of the other check valves, the valve member 350 is moved into contact with a second valve seat 332 to interrupt the communication between the load pressure chamber 40 and a valve chamber 340. Thus, the maximum load pressure is outputted from the detection port D (FIG. 6). One of the passages 63 is connected to the tank via a passage (formed in the body 11 and having an orifice) so as to relief the pressures in all of the passages 63, so that the check valves can respond to the maximum load pressure.

While the invention has been specifically shown and described herein, the invention itself is not to be restricted to the exact showing of the drawings and the description thereof, and various modifications can be made without departing from the spirits of the invention.

What is claimed is:

1. A hydraulic control system for driving a plurality of actuators, comprising:

(a) a pump;

(b) a plurality of directional control valves corresponding respectively to the plurality of actuators, each directional control valve comprising a pair of downstream throttle portions disposed between said pump and the corresponding actuator, and a spool for controlling the degree of opening of said pair of downstream throttle portions, and either of said two downstream throttle portions being opened in accordance with the movement of said spool to apply fluid to the corresponding actuator from said pump;

(c) detection valve means comprising at least one detection valve for detecting the maximum load pressure among load pressures of the plurality of actuators;

(d) a plurality of pressure compensation valves corresponding respectively to the plurality of actuators, each pressure compensation valve comprising an upstream throttle portion disposed between said pump and said pair of downstream throttle portions, and a balance piston for controlling the degree of opening of said upstream throttle portion, said balance piston having a first pressure receiving portion for receiving the load pressure of the corresponding actuator so as to move said balance piston in a direction to open said upstream throttle portion, said balance piston also having a second pressure receiving portion for receiving a supply pressure supplied from said upstream throttle portion to said downstream throttle portions so as to move said balance piston in a direction to close said upstream throttle portion, said balance piston including pressure receiving means for substantially receiving an operating pressure which decreases when the difference between the pressure of said pump and the maximum load pressure detected by said detection valve means decreases so that said balance piston can be moved in the direction to open said upstream throttle portion, and the position of said balance piston being so controlled that the force acting on said balance piston due to the difference between said supply pressure and said load pressure can be in equilibrium with the force acting on said balance piston due to said operating pressure received by said pressure receiving means; and (e) body means comprising a plurality of regions corresponding respectively to the plurality of actuators, said plurality of directional control valves as well as said plurality of pressure compensation valves being mounted respectively in said plurality of regions, each of said regions including a straight first hole and a straight second hole substantially perpendicularly intersecting a central portion of said first hole, said spool being slidably received in said first hole of the corresponding region of said body means, the intersection between said first and second holes forming a load pressure chamber for receiving the load pressure of the corresponding actuator, and said second hole having a first portion and a second portion between which said load pressure chamber is interposed, said balance piston of said pressure compensation valve being slidably received in said first portion of said second hole of the corresponding region of said body means, said first pressure receiving portion of said balance piston being directed toward said load pressure chamber, and said detection valve being received in said second portion of said second hole of one of said regions of said body means so as to receive the load pressure from said load pressure chamber.

2. A hydraulic control system according to claim 1, in which said plurality of regions of said body means are arranged in juxtaposed relation to one another, said first hole and second hole of each of said plurality of regions being disposed on a plane perpendicular to the direction of arrangement of said plurality of regions.

3. A hydraulic control system according to claim 2, in which said body means comprises a unitary block having said plurality of regions arranged continuously with one another.

4. A hydraulic control system according to claim 3, in which said detection valve means comprises a plurality of said detection valves each in the form of a shuttle valve, said shuttle valves being received respectively in said second portions of said second holes of all of said regions of said body means except for one region disposed immediately adjacent to one end of said body means, each shuttle valve including a first inlet port exposed to said load pressure chamber, a second inlet port, and an output port, said outlet port of one of each adjacent shuttle valves being connected to said second inlet port of the other shuttle valve via a pressure transmitting passage, said load pressure chamber of said one region of said body means being connected to said second inlet port of said shuttle valve of its adjoining region of said body means via a pressure transmitting passage, said outlet port of said shuttle valve of said region disposed immediately adjacent to the other end of said body means remote from said one region being connected via a pressure transmitting passage to a detection pressure port formed in the outer surface of said body means, so that the maximum load pressure is outputted from said detection pressure port, and all of said pressure transmitting passages being disposed along a straight line extending in the direction of arrangement of said plurality of regions.

5. A hydraulic control system according to claim 3, in which each of said plurality of regions has a pair of actuator ports disposed on said plane, one ends of said two actuator ports opening to an outer surface of said block and being connected to the corresponding actuator whereas the other ends are connected to opposite side portions of said first hole disposed respectively on the opposite sides of said load pressure chamber, each of said plurality of regions having a pair of first passages disposed on said plane, one end of each of said first passages being connected to said first portion of said second hole intermediate opposite ends of said first portion whereas the other end is connected to that portion of said first hole disposed between said load pressure chamber and the other end of said actuator port.

6. A hydraulic control system according to claim 5, in which said spool of said directional control valve has a pair of second passages; in accordance with the movement of said spool in one direction, said load pressure chamber being caused to communicate via one of said second passages with one of said pair of actuator ports through which the fluid from said pump is flowing; and in accordance with the movement of said spool in the opposite direction, said load pressure chamber being caused to communicate via the other second passage with the other actuator port through which the fluid from said pump is flowing.

7. A hydraulic control system according to claim 6, in which said body means has a fluid supply passage extending straight in the direction of arrangement of said plurality of regions and substantially perpendicularly intersecting said first portions of said second holes of said plurality of regions intermediate opposite ends of each said first portion, one end of said fluid supply passage opening to the outer surface of said body means to form a pump port connected to said pump, said balance piston having a first land portion slidably engaged with that portion of the inner peripheral surface of said second hole disposed between the intersection of said fluid supply passage and said second hole and the intersection of each said first passage and said second hole, said first land portion cooperating with said that portion to form said upstream throttle portion, said spool having a pair of second land portions slidably engaged with the inner periphery of said first hole, one of said pair of second land portions cooperating with that portion of the inner peripheral surface of said first hole disposed between the intersection of one of said two actuator ports and said first hole and the intersection of one of said two first passages and said first hole to form one of said two downstream throttle portion, and the other second land portion cooperating with that portion of the inner peripheral surface of said first hole disposed between the intersection of the other actuator port and said first hole and the intersection of the other first passage and said first hole to form the other downstream throttle portion.

8. A hydraulic control system according to claim 2, in which said pressure receiving means of said balance piston comprises a third pressure receiving portion for receiving a first control pressure, and a fourth pressure receiving portion for receiving a second control pressure, the force acting on said balance piston due to said first control pressure serving to move said balance piston in the direction to open said upstream throttle portion, the force acting on said balance piston due to said second control pressure serving to move said balance piston in the direction to close said upstream throttle portion, and a difference between said first control pressure and said second control pressure defining said operating pressure received by said pressure receiving means, and being substantially equal to the difference between said pump pressure and said maximum load pressure.

9. A hydraulic control system according to claim 8, in which said fourth pressure receiving portion is formed on one end of said balance piston remote from said load pressure chamber, said second and third pressure receiving portions being formed on that portion of said balance piston disposed intermediate the opposite ends of said balance piston.

10. A hydraulic control system according to claim 8, further comprising a pressure differential detector for detecting a difference between said pump pressure and said maximum load pressure to output a detection signal, means for producing said first control pressure, and means for producing said second control pressure, said first control pressure producing means comprising a pilot pump for supplying said first control pressure of a constant level to said third pressure receiving portion of said balance piston, said second control pressure producing means being responsive to said detection signal for supplying said second control pressure to said fourth pressure receiving portion, and said second control pressure being substantially equal to a value obtained from subtracting from said first control pressure the pressure difference detected by said pressure differential detector.

11. A hydraulic control system according to claim 10, in which said body means further comprises a pilot pressure transmitting passage which extends straight in the direction of arrangement of said plurality regions and is connected to said first portions of said second holes of said plurality of regions intermediate the opposite ends of said first portion, one end of said transmitting passage opening to the outer surface of said body means to form a pilot pump port, said third pressure receiving portion of said balance piston being exposed to that portion of said second hole where said transmitting passage is connected to said second hole.

12. A hydraulic control system according to claim 8, in which said pump pressure is applied as said first control pressure directly to said third pressure receiving portion, the maximum load pressure from said detection valve means being applied as said second control pressure to said fourth pressure receiving portion.

13. A hydraulic control system according to claim 2, in which said pressure receiving means has a third pressure receiving portion for receiving a pressure substantially equal to a difference between said pump pressure and said maximum load pressure so as to move said balance piston in the direction to open said upstream throttle portion.

* * * * *

UNITED STATES PATENT AND TRADEMARK OFFICE

CERTIFICATE OF CORRECTION

PATENT NO. : 5,025,625

DATED : June 25, 1991

INVENTOR(S) : Rindo Morikawa

It is certified that error appears in the above-identified patent and that said Letters Patent is hereby corrected as shown below:

On the cover page, at "[73] Assignee:", please add --Diesel Kiki Co., Ltd.--.

Signed and Sealed this

Twenty-seventh Day of April, 1993

*Attest:*

MICHAEL K. KIRK

*Attesting Officer*

*Acting Commissioner of Patents and Trademarks*